US012558897B2

(12) United States Patent
Watanabe

(10) Patent No.: US 12,558,897 B2
(45) Date of Patent: Feb. 24, 2026

(54) SUBSTRATE JOINT BODY, METHOD OF MANUFACTURING THE SUBSTRATE JOINT BODY, AND LIQUID EJECTION HEAD

(71) Applicant: CANON KABUSHIKI KAISHA, Tokyo (JP)

(72) Inventor: Keiji Watanabe, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 134 days.

(21) Appl. No.: 18/497,832

(22) Filed: Oct. 30, 2023

(65) Prior Publication Data

US 2024/0140097 A1 May 2, 2024

(30) Foreign Application Priority Data

Nov. 1, 2022 (JP) ................................ 2022-175333

(51) Int. Cl.
*B41J 2/16* (2006.01)
*B41J 2/14* (2006.01)

(52) U.S. Cl.
CPC ............... *B41J 2/1623* (2013.01); *B41J 2/14* (2013.01); *B41J 2202/11* (2013.01); *B41J 2202/22* (2013.01)

(58) Field of Classification Search
CPC ........ B41J 2/1623; B41J 2/14; B41J 2202/11; B41J 2202/22; B41J 2/1607; B41J 2/1628; B41J 2/1629; B41J 2/1632; B41J 2/1634; B41J 2/1603; B41J 2/1631; B41J 2/1645
See application file for complete search history.

(56) References Cited

U.S. PATENT DOCUMENTS

2022/0274406 A1* 9/2022 Higuchi ................ B41J 2/1623

FOREIGN PATENT DOCUMENTS

JP 2001162802 A 6/2001

* cited by examiner

*Primary Examiner* — Lisa Solomon
(74) *Attorney, Agent, or Firm* — Canon U.S.A., Inc., IP Division

(57) ABSTRACT

A substrate joint body includes a first substrate that has a first surface and a second surface facing away from the first surface and has an opening in the second surface, and a second substrate joined to the second surface with an adhesive agent, and the opening is covered with the second substrate, wherein a recessed portion extending from a position exposed to the opening toward a position facing an opening edge of the opening on the second surface is formed in a third surface of the second substrate such that an adhesive agent protruding from a joint portion between the first substrate and the second substrate reaches a third surface of the second substrate that faces the opening.

13 Claims, 4 Drawing Sheets

SUBSTRATE JOINT BODY, METHOD OF MANUFACTURING THE SUBSTRATE JOINT BODY, AND LIQUID EJECTION HEAD

BACKGROUND

Field of the Disclosure

The present disclosure relates to a substrate joint body including a plurality of joined substrates, a method of manufacturing the substrate joint body, and a liquid ejection head that uses the substrate joint body.

Description of the Related Art

A liquid ejection head that has ejection ports and ejects a liquid toward a print medium is as an example of the structure obtained by microfabricating a silicon substrate. Since the liquid ejection head is manufactured by joining, with an adhesive agent, a plurality of substrates having engraved portions, such as grooves and the through-holes, the liquid ejection head is a type of a substrate joint body. In the liquid ejection head, grooves and through-holes are used as flow paths for a liquid, such as ink, to be ejected from the ejection ports. Accordingly, when the substrates are joined together, recesses and through-holes need be prevented from being blocked by the adhesive agent extruded by pressing a joint portion for joint purposes. Japanese Patent Laid-Open No. 2001-162802 discloses a technology that prevents the adhesive agent from blocking recesses and through-holes by providing, in one substrate, a groove-like adhesive agent entry region that opens at a position (that is, a joint portion) at which two substrates are in contact with each other and receiving the adhesive agent extruded by using the adhesive agent entry region.

In the substrate joint body in which engraved portions such as grooves and the through-holes open in the surface of one substrate, wicking of the adhesive agent extruded during joint is likely to occur in valleys formed by the side surfaces of engraved portions. The technology disclosed in Japanese Patent Laid-Open No. 2001-162802 cannot effectively prevent the wicking of the adhesive agent. Furthermore, since the adhesive agent entry region need be provided in the technology disclosed in Japanese Patent Laid-Open No. 2001-162802, downsizing of the substrate joint body is hindered, and reliability decreases because the adhesive agent entry region is blocked by the adhesive agent.

SUMMARY

The present disclosure provides a substrate joint body that can be easily downsized and has high reliability and provides a liquid ejection head that uses the substrate joint body.

A substrate joint body according to the present disclosure includes: a first substrate that has a first surface and a second surface facing away from the first surface, the first substrate having an opening formed in the second surface; and a second substrate joined to the second surface with an adhesive agent, the opening being covered with the second substrate, in which a recessed portion extending from a position exposed to the opening toward a position facing an opening edge of the opening on the second surface is formed in a third surface of the second substrate such that an adhesive agent protruding from a joint portion between the first substrate and the second substrate reaches the recessed portion, the third surface facing the opening.

Further features of the present disclosure will become apparent from the following description of exemplary embodiments with reference to the attached drawings.

DESCRIPTION OF THE EMBODIMENTS

Figure 1:
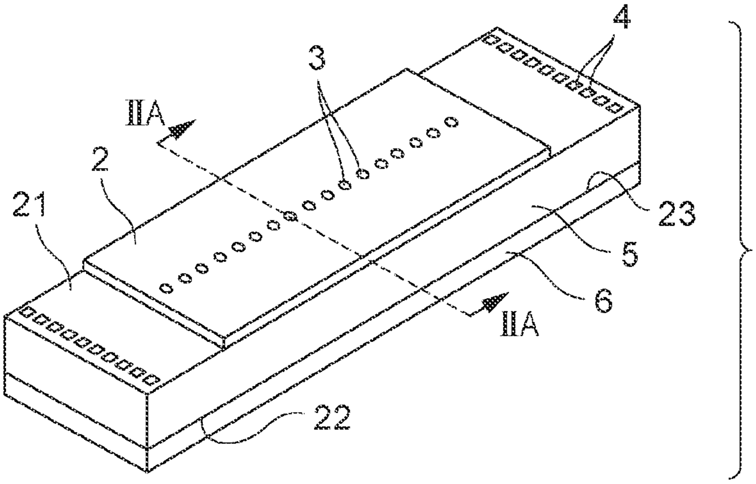
FIG. 1 is a perspective view illustrating a print element substrate that is an example of a substrate joint body, according to one or more embodiment of the subject disclosure.

Next, embodiments of the present disclosure will be described. Although the embodiments described below facilitate understanding of the present disclosure, the present disclosure is not limited to only the following embodiments. In addition, not all combinations of features described in the following embodiments are essential to solve the problems of the present disclosure. In the embodiments, the relative disposition and shapes of components are only examples, and the scope of the present disclosure is not limited to the relative disposition and shapes. It should be noted that, in the following description, the same components are denoted by the same reference numerals.

The present disclosure relates to a substrate joint body including a first substrate and a second substrate to be joined to the first substrate with an adhesive agent, and an opening of the first substrate is covered with the second substrate. The opening formed in the first substrate is an opening of an engraved portion formed by, for example, etching the surface of the first substrate, and this engraved portion may pass through the first substrate or may not pass through the first substrate. The substrate joint body as described above is obtained by joining, with the adhesive agent, substrates obtained by microfabricating, for example, silicon (Si) substrates or the like, and the substrate joint body is used for microdevices in the MEMS (micro electromechanical system) field and the electromechanical field. The substrate joint body according to the present disclosure will be described below on the assumption that the substrate joint body is used for a liquid ejection head that ejects a liquid, such as ink, from ejection ports. Accordingly, the liquid ejection head will be described before the substrate joint body according to the present disclosure is described.

The liquid ejection head is installed in a liquid ejecting apparatus and ejects a liquid, such as ink, to a print medium for recording purposes, for example. The liquid ejection head includes mainly a print element substrate and an electrical wiring board and may further include a tank for storing liquid to be ejected. The print element substrate is provided with a print element that generates energy for ejecting a liquid, and an electrical signal input terminal that transmits an electrical signal to the print element. The print element substrate and the electrical wiring board can be electrically joined to each other via the electrical signal input terminal, and recording by the liquid ejection device is possible by bringing a terminal provided in the electrical wiring board into electrical contact with a contact pin provided in a carriage of the liquid ejection device. In addition to the print element, the print element substrate includes an ejection port forming member having the ejection ports and individual flow paths that pass above the print element and communicate with the ejection ports and a flow path substrate that has a common flow path and a supply path that supply a liquid to be ejected to the individual flow paths. The flow path substrate is formed by joining the substrate in which the common flow path is formed and a through-flow path through which a liquid is supplied to the common flow path to each other with the adhesive agent. Since the liquid ejection head need be downsized and perform recording at high resolution and at high speed, the ejection ports need be disposed at higher density. The high-definition flow paths are required to downsize the liquid ejection head and increase the density of the ejection ports. Accordingly, it is necessary to prevent the supply path for connecting the common flow path to the individual flow paths from being blocked by the adhesive agent with greater certainty. Therefore, the wicking amount of the adhesive agent for forming the flow path substrate need be minimized.

First Embodiment

FIG. 1 illustrates a print element substrate used in a liquid ejection head in a first embodiment of the present disclosure. The print element substrate 1 includes an ejection port forming member 2 including a row of ejection ports 3, a first flow path substrate 5 including a first surface 21 and a second surface 22 facing away from the first surface 21, and a second flow path substrate 6. The ejection port forming member 2 is formed on the first surface 21 of the first flow path substrate 5. A group of electrical signal input terminals 4 for electrical connection with an electrical wiring board (not illustrated) is also formed in the first surface 21 of the first flow path substrate 5. The second flow path substrate 6 is joined to the second surface 22 of the first flow path substrate 5 via an adhesive agent 12 (see FIG. 2).

Figure 2A:
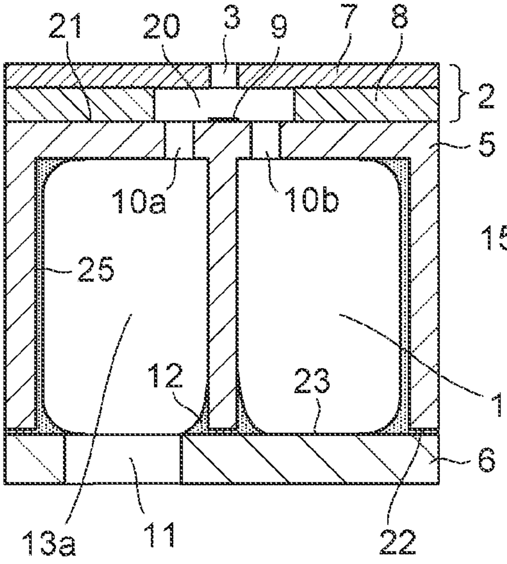
FIGS. 2A and 2B are diagrams illustrating a print element substrate according to a first embodiment of the subject disclosure.
Figure 2B:
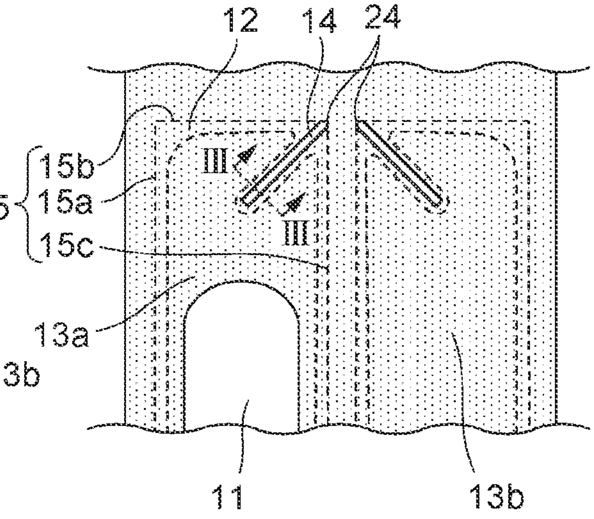

FIG. 2A is a sectional view of the print element substrate 1 taken along line IIA-IIA in FIG. 1, and FIG. 2B is a transparent top view illustrating a main portion of the second flow path substrate 6 as viewed from the first flow path substrate 5 with the ejection port forming member 2 removed. The first surface 21 of the first flow path substrate 5 is provided with a print element 9 that generates energy necessary for ejecting a liquid and is further provided with electrical signal wiring (not illustrated) for driving the print element 9. An electrothermal transducer that foams the liquid with heat, a piezoelectric element that is deformed due to the piezoelectric effect and gives kinetic energy to the liquid, or the like are used as the print element 9. The ejection port forming member 2 has a two-layer structure including an ejection port forming region 7 in which the ejection ports 3 are provided as through-holes, and a flow path forming region 8 that is present between the ejection port forming region 7 and the first flow path substrate 5 and has individual flow paths. A pressure chamber 20 that communicates with the ejection ports 3 is formed as a part of the individual flow paths in the flow path forming region 8 at the position at which the print element 9 is formed, and the print element 9 can give energy for ejection to the liquid in the pressure chamber 20. A liquid-repellent layer (not illustrated) for improving ejection performance may be formed on the surface of the ejection port forming region 7.

A pair of common flow paths 13*a* and 13*b* that supply the liquid to the plurality of ejection ports 3 is provided as a groove-like engraved portions in the second surface 22 of the first flow path substrate 5 and open to the second surface 22. In the present embodiment, the plurality of ejection ports 3 form a row of ejection ports in the ejection port forming member 2, and the common flow paths 13*a* and 13*b* are provided on both sides of the row of ejection ports to extend in the direction identical to the extension direction of the row of ejection ports. Liquid flow paths 10*a* and 10*b* that pass through the first flow path substrate 5 and communicate with the pressure chamber 20 described above are formed in the innermost portions in the depth direction of the common flow paths 13*a* and 13*b*, that is, in the bottom portions of the engraved portions. The liquid flow paths 10*a* and 10*b* function as, for example, supply flow paths for supplying the liquid to the pressure chamber 20 and enable the liquid to circulate between the common flow paths 13*a* and 13*b* and the pressure chamber 20.

The shape of each of the opening edges 15 of the common flow paths 13*a* and 13*b* on the second surface of the first flow path substrate 5 is typically an elongated rectangle having four right-angled corner portions 24. In addition, valleys 26 (see FIG. 5) connected to the corner portions 24 of the opening edges 15 are formed between the side surfaces 25 of the common flow paths 13*a* and 13*b* formed as the groove-like engraved portions. The valley 26 here is a portion at which two planes intersect each other when viewed locally on the side surfaces 25 of the engraved portion, or a linear portion that is located between the side surfaces 25 of the engraved portion and has a curvature radius smaller than the vicinity.

The second flow path substrate 6 is joined to the second surface 22 of the first flow path substrate 5 via the adhesive agent 12. Through-flow paths 11 that communicate with the common flow paths 13*a* and 13*b*, respectively, are provided in the second flow path substrate 6 as through-holes. Only the through-flow path 11 that communicates with one common flow path 13*a* is illustrated in the drawing because the drawing illustrates only a part of the print element substrate. The through-flow path 11 that communicates with the other common flow path 13*b* is provided at another position in the direction in which the row of ejection ports extends. As a result, the one through-flow path 11 communicates with the other second through-flow path (not illustrated) through the common flow path 13*a*, the liquid flow path 10*a*, the pressure chamber 20, the liquid flow path 10*b*, and the common flow path 13*b*. In the liquid ejection head described above, the liquid is ejected from the ejection ports 3 in two forms. In the first form, the liquid is supplied to the pressure chamber 20 from both through-flow paths 11 through the common flow paths 13*a* and 13*b* and the liquid flow paths 10*a* and 10*b*, and ejection energy is given to the liquid in the pressure chamber 20 by driving the print element 9, and the liquid is ejected from the ejection ports 3.

In the second form, the liquid is supplied from one through-flow path 11*a* to the pressure chamber 20 via the common flow path 13*a* and the liquid flow path 10*a*, and the liquid not ejected from the ejection ports 3 is recovered from the other through-flow path (not illustrated) through the liquid flow path 10*b* and the common flow path 13*b*.

In the print element substrate 1 illustrated in FIG. 2A, the first flow path substrate 5 and the second flow path substrate 6 correspond to the first substrate and the second substrate, respectively, of the substrate joint body according to the present disclosure. The common flow paths 13*a* and 13*b*, which are the engraved portions, form openings on the second surface 22 of the first flow path substrate 5. When the first flow path substrate 5 and the second flow path substrate 6 are joined to each other, the common flow paths 13*a* and 13*b* that form the openings are covered with the second flow path substrate 6. The surface 23 of the surfaces of the second flow path substrate 6 that faces the common flow paths 13*a* and 13 corresponds to the third surface.

Silicon can be used as the substrate material for forming the first flow path substrate 5 and the second flow path substrate 6. In addition to silicon, inorganic silicon compounds, such as silicon carbide and silicon nitride, various types of glass, such as quartz glass and borosilicate glass, semiconductors, such as gallium arsenide, ceramics, such as alumina, resins, and the like can be also used as substrate materials that constitute the flow path substrates 5 and 6.

The flow path substrates 5 and 6 can be formed by microfabricating these substrate materials. Dry etching, wet etching, laser processing, or the like can be used to form the common flow paths 13*a* and 13*b* and the through-flow path 11 in the substrates. In addition, to adjust the depth of the common flow paths 13*a* and 13*b*, that is, the height in the sectional direction, the thickness of the first flow path substrate 5 may be reduced by performing back grinding or chemical mechanical polishing (CMP). The ejection port forming member 2 may be provided on the first surface 21 of the first flow path substrate 6 before the first flow path substrate 5 and the second flow path substrate 6 are joined to each other. Alternatively, the ejection port forming member 2 may be provided on the first surface 21 after the first flow path substrate 5 and the second flow path substrate 6 are joined to each other.

Figure 5:
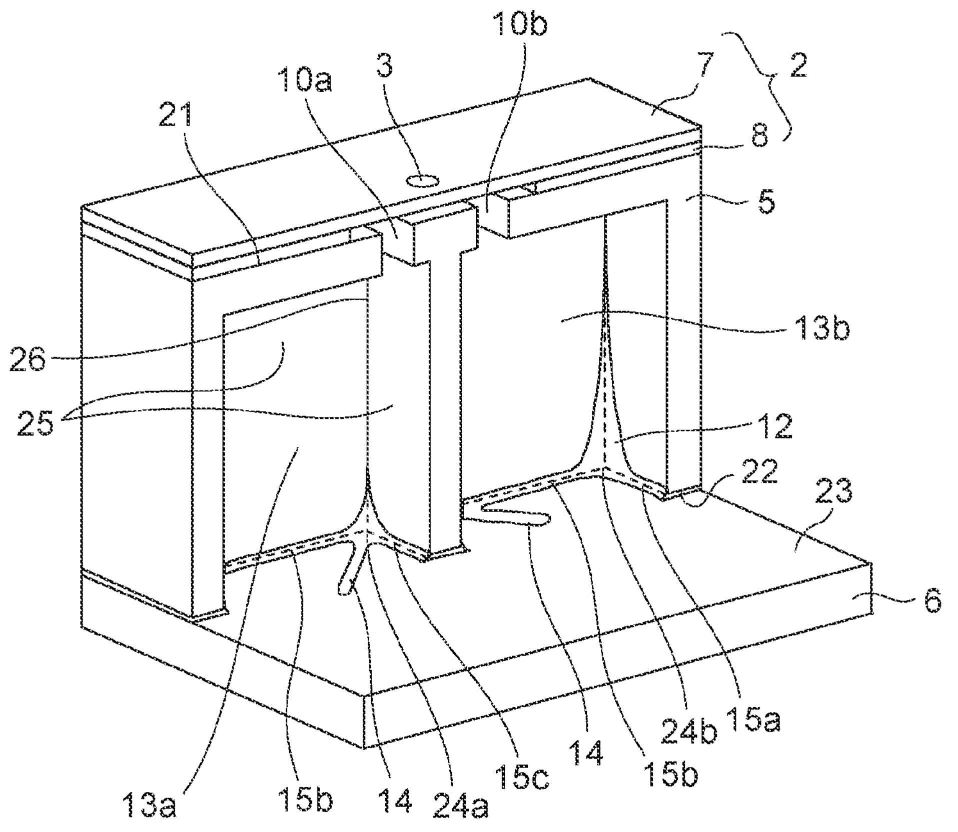
FIG. 5 is a cutaway perspective view illustrating the print element substrate according to the first embodiment of the subject disclosure.

Next, the joint between the first flow path substrate 5 and the second flow path substrate 6 with an adhesive agent will be described in detail. Since the groove-like engraved portions that constitute the common flow paths 13*a* and 13*b* are formed in the second surface 22 of the first flow path substrate 5, the adhesive agent is applied to the entire surface of the second surface 22 of the first flow path substrate 5 except the position of the openings of the engraved portions. An adhesive agent layer may be transferred instead of the application. Then, the first flow path substrate 5 to which the adhesive agent has been applied and the second flow path substrate 6 are brought into contact with each other and pressed, and the adhesive agent is cured in this state to join the first flow path substrate 5 and the second flow path substrate 6 to each other. When the adhesive agent 12 is pressed before being cured, the adhesive agent 12 may be extruded from the joint portion and protrude into the common flow paths 13*a* and 13*b*. As illustrated in FIG. 5 to be described later, wicking of the adhesive agent 12 is likely to occur along the side surfaces 25 as walls of the common flow paths 13*a* and 13*b*, particularly along the portions of the valleys 26 connected to the corner portions 24 (or corner portions 24*a* and 24*b*) of the side surfaces 25. As a result, when the protruding amount of the adhesive agent 12 is large, there is a concern that the wicking of the adhesive agent 12 having protruded blocks the liquid flow paths 10*a* and 10*b*. Accordingly, in the present embodiment, to reduce the wicking amount of the adhesive agent 12, groove-like recessed portions 14, which receive the protruding adhesive agent 12 before being cured, are provided in the surface 23 of the second flow path substrate 6 facing the common flow paths 13*a* and 13*b* of the first flow path substrate 5. The adhesive agent 12 protrudes from the opening edges 15 of the openings of the common flow path 13*a* and 13*b* on the second surface of the first flow path substrate 5.

Accordingly, the recessed portions 14 are provided to extend from the positions exposed to the common flow paths 13*a* and 13*b* on the surface 23 of the second flow path substrate 6 toward the positions corresponding to the opening edges 15 of the common flow paths 13*a* and 13*b*. The adhesive agent 12 having flowed into the recessed portions 14 is cured within the recessed portions 14 in the subsequent curing step.

As described above, wicking of the adhesive agent 12 is likely to occur in the valleys 26 formed by the side surfaces of the common flow paths 13*a* and 13*b*. Accordingly, the recessed portions 14 can be provided to extend from the positions exposed to the common flow paths 13*a* and 13*b* toward the positions corresponding to the corner portions 24 of the opening edges 15 of the common flow paths 13*a* and 13*b*. In FIG. 2B, the position of one end of the groove-like recessed portion 14 corresponds to the corner portion 24 of the opening edge 15. The recessed portions 14 can be provided at only the corner portions 24 at which wicking of the adhesive agent 12 greatly affects the liquid flow paths 10*a* and 10*b* among the corner portions 24 of the opening edges 15 of the common flow paths 13*a* and 13*b*. Since the shape of each of the opening edges 15 of the common flow paths 13*a* and 13*b* is a rectangle, a pair of long sides of the rectangle is sides 15*a* and 15*c*, and one of short sides is a side 15*b*. The side 15*a*, the side 15*b*, and the side 15*c* constitute the opening edge 15. Here, the side 15*c* is a side of a base portion that separates the common flow paths 13*a* and 13*b* from each other.

When the sides 15*a* to 15*c* of the opening edge 15 are defined as described above, in the illustrated example, the liquid flow path 10*a* is formed at a position close to the side 15*b* and closer to the side 15*c* than the side 15*a*. In such a case, it is possible to provide the recessed portion 14 so as to correspond to the corner portion 24 at which the side 15*b* and the side 15*c* intersect each other and not to provide the recessed portion 14 in the corner portion 24 that is away from the liquid flow path 10*a* and considered to be less affected by wicking of the adhesive agent 12 and in which the side 15*a* and the side 15*b* intersect each other.

Although the recessed portions 14 are provided to absorb the protruding adhesive agent 12 in the present embodiment, to absorb more amount of adhesive agent 12, the adhesive agent 12 can flow into the groove-like recessed portions over the entire length. A capillary force greatly contributes to the inflow of the adhesive agent 12 into the recessed portions 14. From this point of view, the width of the groove-like recessed portion 14 can be smaller than the depth of the recessed portion 14. A smaller width can generate a greater capillary force and a larger depth can increase the storage capacity of the adhesive agent in the recessed portion 14. Such a shape can promote the active flow of the adhesive agent 12 into the recessed portion 14 and suppress the adhesive agent 12 from concentrating on the corner portions 24 of the opening edge 15. The lengths of the recessed portions 14 can be determined as appropriate, but the lengths of the recessed portions 14 can be longer than the depths of the common flow paths 13*a* and 13*b* of the first flow path substrate 5 to prevent wicking of the adhesive agent 12 by increasing the storage capacity of the adhesive agent 12. Only one end in the longitudinal direction of the recessed portion 14 can extend to the position facing the opening edge 15 of each of the common flow paths 13*a* and 13*b*. The other end of the recessed portion 14 can be disposed outside the reach of the adhesive agent 12 protruding from the opening edge 15 on the surface 23 of the second flow path substrate 6. That is, the adhesive agent 12 can flow into the groove-like recessed portion 14 from only one side. Inflow of the adhesive agent 12 from both ends in the longitudinal direction to the recessed portion 14 reduces the amount of the adhesive agent 12 received from the specific corner portions 24 for which wicking of the adhesive agent 12 need be prevented.

Figures 3A, 3B, 3C, 3D:
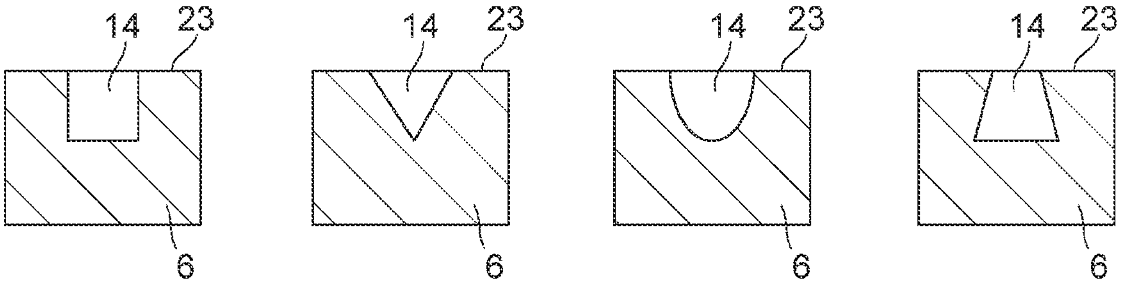
FIGS. 3A, 3B, 3C, and 3D are diagrams illustrating sectional shapes of recessed portions, according to one or more embodiment of the subject disclosure.

FIG. 3 is a diagram for describing the sectional shape of the groove-like recessed portion 14 and illustrates a cross section taken along line III-III in FIG. 2A. The sectional shape of the recessed portion 14 can be selected as appropriate according to the use of the substrate joint body that is, for example, a liquid ejection head. FIG. 3A illustrates the recessed portion 14 having a square or rectangular sectional shape. Since this sectional shape can increase the storage capacity of the adhesive agent 12 of the recessed portion 14 per length, this recessed portion 14 can be used when the protruding amount and the wicking amount of the adhesive agent 12 are large. The recessed portion 14 illustrated in FIG. 3B has a sectional shape of an inverted triangle that narrows with the depth, and the dihedral angle between both sides of the recessed portion 14 is less than 90° (that is, an acute angle), a strong capillary force can be generated. The recessed portion 14 illustrated in FIG. 3B can be used when the strongest capillary force is required. Since the recessed portion 14 illustrated in FIG. 3C has a semi-elliptical sectional shape, reduction in the strength of the second flow path substrate 6 due to formation of the recessed portion 14 is small and has a relatively large sectional area. The recessed portion 14 illustrated in FIG. 3C can be used to suppress the protruding amount and the wicking amount of the adhesive agent 12 and to obtain the strength of the substrate. The recessed portion 14 illustrated in FIG. 3D has a sectional shape of an isosceles trapezoid having an upper base close to the surface 23 of the second flow path substrate 6 and a lower base that is longer than the upper base, the sectional area is relatively large, and sharp corner portions are provided in in the cross section, and accordingly, the capillary force is also large. The recessed portion 14 illustrated in FIG. 3D can be used to increase the storage capacity of the adhesive agent 12 in the recessed portion 14.

Figure 4:
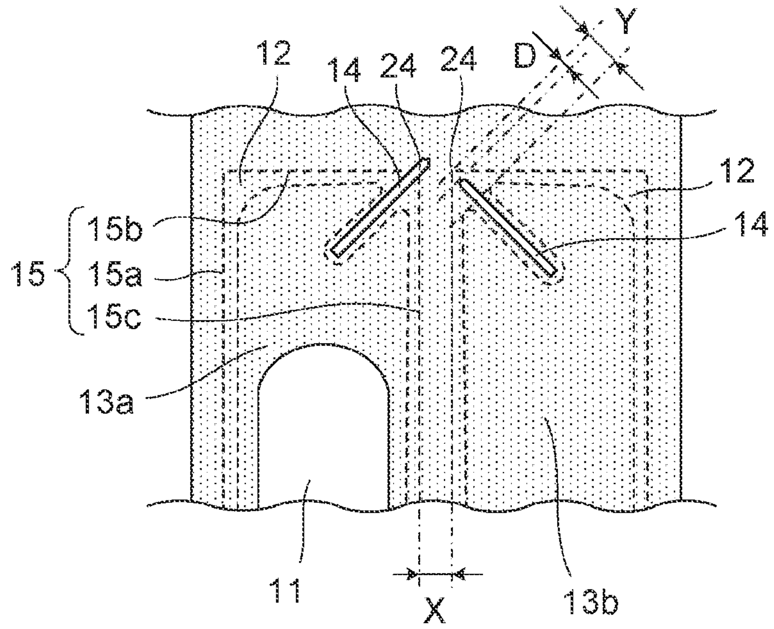
FIG. 4 is a transparent top view illustrating another example of disposition of the recessed portions, according to one or more embodiment of the subject disclosure.

Dry etching, wet etching, laser processing, or the like can be used to form the groove-like recessed portions 14 in the second flow path substrate 6. In addition, as in the common flow path 13*a* illustrated in FIG. 4, the recessed portions 14 may extend to the position at which the second surface 22 of the first flow path substrate 5 and the surface of the second flow path substrate 6 are actually joined to each other with the adhesive agent 12 beyond the position facing the corner portion 24 of the opening edge 15. This structure can be used when the length of the groove-like recessed portions is restricted because more amount of adhesive agent 12 can be absorbed. However, the length extending beyond the corner portion 24 is preferably equal to or less than half a thickness X of the wall that separates the common flow paths 13*a* and 13*b* from each other. Alternatively, as in the common flow path 13*b* illustrated in FIG. 4, even when the recessed portion 14 is close to the corner portion 24 of the opening edge 15 but does not reach the corner portion 24, the recessed portion 14 may extend to the place to which the adhesive agent 12 having protruded from the joint portion can reach. Such a situation can occur when, for example, there is misalignment of joint between the first flow path substrate 5 and the second flow path substrate 6. When the recessed portion 14 does not reach the position facing the corner portion 24 on the opening edge 15, the distance between the end portion of the recessed portion 14 and the corner portion 24 is equal to or less than the protruding amount of the adhesive agent 12. Specifically, the recessed portion 14 can be disposed such that distance D from the corner portion 24 at which the side 15*b* and the side 15*c* intersect each other to the end portion of the recessed portion 14 is preferably ½ or less of protruding amount Y of the adhesive agent, and the recessed portion 14 does not reach the side 15*a*. When the recessed portion 14 is disposed as described above, the protruding adhesive agent 12 is suppressed from concentrating on the corner portion 24 of the opening edge 15, thereby suppressing wicking of the adhesive agent 12 along the valleys 26 of the side surfaces 25 of the common flow paths 13*a* and 13*b*.

A material having a high adhesiveness to the first flow path substrate 5 and the second flow path substrate 6 can be used as the adhesive agent 12 used to join these flow path substrates 5 and 6 to each other. In addition, the material of the adhesive agent 12 can be a material that contains less air bubbles, has high applicability, and has a low viscosity for easily reducing the thickness of the adhesive agent 12. Specifically, the material used for the adhesive agent 12 can include any resin selected from a group including epoxy resin, acrylic resin, silicone resin, benzocyclobutene resin, polyamide resin, polyimide resin, and urethane resin. Heat curing or UV delayed curing can be used to cure the adhesive agent 12. When at least one of the flow path substrates 5 and 6 is UV transparent, UV curing can also be used to cure the adhesive agent 12. The first flow path substrate 5 and the second flow path substrate 6 are joined to each other by applying the adhesive agent 12, heating the flow path substrates 5 and 6 to a predetermined temperature in a joint apparatus, and performing pressurization at a predetermined pressure for a predetermined time. The joint parameters are appropriately set according to the material used as the adhesive agent 12. In addition, joint can be performed in a vacuum to suppress air bubbles from entering the joint portion. Furthermore, curing can be sufficiently promoted by further heating the flow path substrates 5 and 6 joined to each other.

FIG. 5 is a cutaway perspective view illustrating the print element substrate 1 according to the present embodiment configured as a substrate joint body as described above. When the first flow path substrate 5 and the second flow path substrate 6 are joined to each other with the adhesive agent 12, the adhesive agent 12 is extruded from the joint portion and protrudes into the common flow paths 13*a* and 13*b*.

In the present embodiment, most of the protruding adhesive agent 12 before being cured flows into the groove-like recessed portions 14 and is stored in the recessed portion 14. As a result, at the corner portions 24*a* having the recessed portion 14 among the corner portions 24*a* and 24*b* of the opening edges 15 of the common flow paths 13*a* and 13*b*, the wicking amount of the adhesive agent 12 along the valleys 26 connected to the corner portions 24*a* is smaller than the wicking amount of the adhesive agent 12 in the corner portion 24*b* having no recessed portions 14. As a result, the possibility that the liquid flow paths 10*a* and 10*b* are blocked by wicking of the adhesive agent 12 is reduced.

In the technology that provides an adhesive agent entry region disclosed in Japanese Patent Laid-Open No. 2001-162802, when two substrates are joined to each other with an adhesive agent, the groove-like adhesive agent entry region is provided so as to open to the joint portion. When this technology is compared with the present embodiment described above, since the adhesive agent entry region is formed in the wall that separates the pair of the common flow paths 13*a* and 13*b*, which are the engraved portions, from each other, the thickness of the wall cannot be reduced, and the liquid ejection head cannot be downsized. On the other hand, in the present embodiment, since the recessed portions 14 for absorbing the adhesive agent are provided at positions on the surface 23 of the second flow path substrate 6 that face the common flow paths 13*a* and 13*b*, the thickness of the wall that separates the pair of common flow paths 13*a* and 13*b* from each other can be sufficiently reduced. In addition, in the technology described in Japanese Patent Laid-Open No. 2001-162802, not all of the adhesive agent having protruded from the joint portion flows into the adhesive agent entry region and part of this adhesive agent protrudes into the engraved portions of the substrates, and accordingly, the adhesive agent may block the flow paths. On the other hand, in the present embodiment, the adhesive agent 12 having protruded into the engraved portions (common flow paths 13*a* and 13*b*) can be captured by the recessed portions 14 with greater certainty, and wicking of the adhesive agent 12 can be prevented. Furthermore, in the technology described in Japanese Patent Laid-Open No. 2001-162802, when the adhesive agent flows into the adhesive agent entry region, a cavity may remain in an inner portion of the adhesive agent entry region, and the expansion and contraction of the air in the cavity may cause deformation of the substrates, but such deformation of the substrates is unlikely to occur in the present embodiment.

When the thickness X of the wall that separates the pair of common flow paths 13*a* and 13*b* from each other is small or when the shape of the opening edges 15 is not rectangular, the protruding amount of the adhesive agent 12 protruding into the common flow paths 13*a* and 13*b* may vary greatly depending on the place. The case in which the protruding amount of the adhesive agent 12 along the opening edges 15 of the common flow paths 13*a* and 13*b* are not uniform will be described below.

Figure 6A:
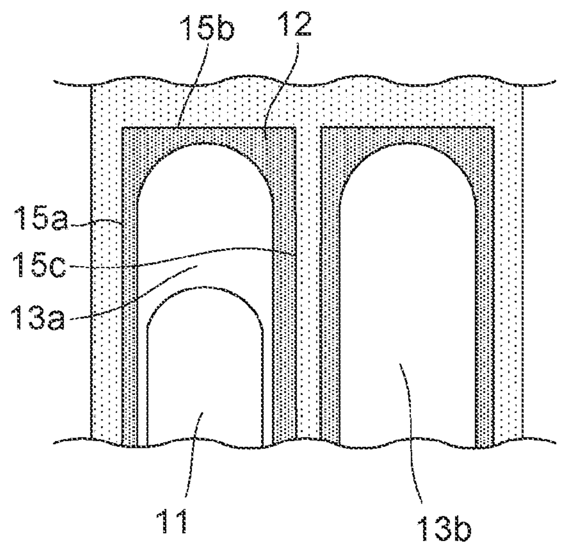
FIGS. 6A and 6B are diagrams illustrating another example of the print element substrate, according to one or more embodiment of the subject disclosure.
Figure 6B:
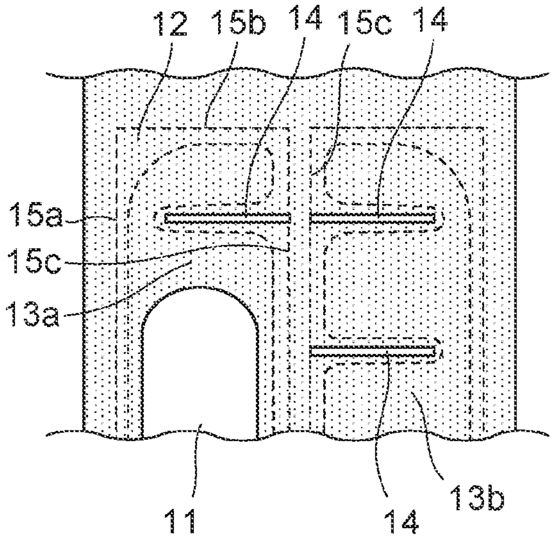

FIG. 6 illustrates the print element substrate 1 when the adhesive agent 12 greatly protrudes into the common flow paths 13*a* and 13*b* along the wall that separates the common flow paths 13*a* and 13*b* from each other because the thickness X of the wall is small. FIG. 6A is a schematic plan view illustrating the distribution of the adhesive agent 12 having protruded onto the surface 23 of the second flow path substrate 6, and FIG. 6B is a transparent top view of a main portion of the second flow path substrate 6 as viewed from the first flow path substrate 5 with the ejection port forming member 2 removed. In the distribution of the adhesive agent 12 illustrated in FIG. 6A, it is assumed that the recessed portions 14 are not provided in the surface 23 of the second flow path substrate 6. In this example, the wall that separates the common flow paths 13*a* and 13*b* from each other corresponds to the side 15*c* of the opening edge 15. When the thickness of this wall is small, the protruding amount of the adhesive agent 12 along the side 15*c* is greater than the protruding amounts along the other sides. In such a case, as illustrated in FIG. 6B, the groove-like recessed portions 14 can be provided in the surface 23 of the second flow path substrate 6 so as to be connected to the sides 15*c* instead of the corner portions 24 of the opening edges 15. The recessed portions 14 are formed in the surface 23 of the second flow path substrate 6 to extend from the positions exposed to the common flow paths 13*a* and 13*b* toward the sides 15 in directions orthogonal to the directions of the sides 15*c*. The number of the groove-like recessed portions 14 provided so as to be connected to the sides 15*c* is not limited to one, and a plurality of recessed portions 14 may be provided for each of the sides 15*c* parallel to each other, as illustrated in the common flow path 13*b* in the drawing.

The disposition of the recessed portions 14 as described above can substantially reduce the protruding amount of the adhesive agent 12 along the sides 15*c* and suppresses the protruding adhesive agent 12 from concentrating on the corner portions 24 of the opening edges 15. This can suppress wicking of the adhesive agent 12 on the side surfaces 25 of the common flow paths 13*a* and 13*b*, particularly wicking along the valleys 26.

The common flow paths 13*a* and 13*b* are usually formed in an elongated rectangular shape, and the internal angles of the corner portions 24 of the opening edges 15 are 90° (right angle). However, the internal angles of the corner portions 24 are not limited to 90° and, when the interior angles are less than 90° (that is, an acute angle), the protruding adhesive agent 12 is likely to concentrate on the corner portion 24. FIG. 7 illustrates the print element substrate 1 in which the internal angles of the corner portions 24 of the opening edges 15 of the common flow paths 13*a* and 13*b* are not 90°.

Figure 7A:
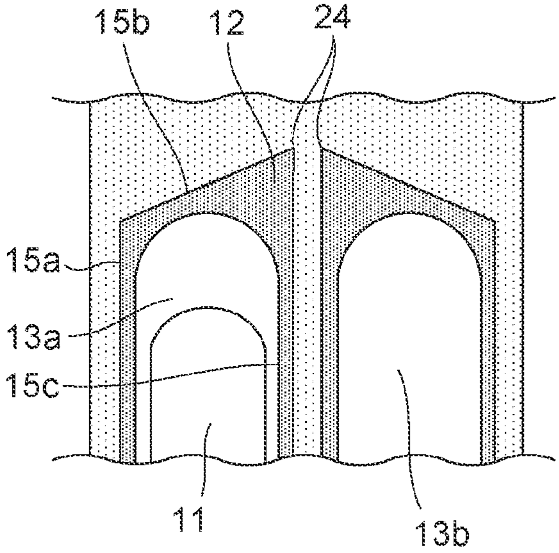
FIGS. 7A and 7B are diagrams illustrating another example of the print element substrate, according to one or more embodiment of the subject disclosure.
Figure 7B:
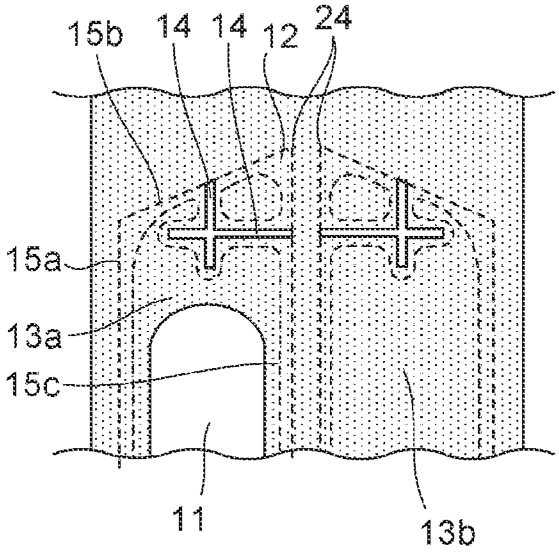

FIG. 7A is a schematic plan view illustrating the distribution of the adhesive agent 12 protruding onto the surface 23 of the second flow path substrate 6, and FIG. 7B is a transparent top view of a main portion of the second flow path substrate 6 as viewed from the first flow path substrate 5 with the ejection port forming member 2 removed. In the distribution of the adhesive agent 12 illustrated in FIG. 7A, it is assumed that the recessed portions 14 are not provided in the surface 23 of the second flow path substrate 6. In the example illustrated here, in the opening edge 15, the internal angle of the corner portion 24 formed by sides 15*b* and 15*c* is less than 90° (that is, an acute angle), and the internal angle of the corner portion 24 formed by sides 15*a* and 15*b* is greater than 90° (that is, an obtuse angle). In this case, since the concentration of the protruding adhesive agent 12 on the corner portion 24 formed by the sides 15*a* and 15*b* is significant, the groove-like recessed portion 14 connected to the side 15*b* and the groove-like recessed portion 14 connected to the side 15*c* are provided on the surface 23 of the second flow path substrate 6 as illustrated in FIG. 7B. The two recessed portions 14 may intersect each other as illustrated in the drawing.

The disposition of the recessed portions 14 as described above suppresses the adhesive agent 12 from protruding along the sides 15*b* and 15*c* and suppresses the adhesive agent 12 from concentrating on the corner portion 24 formed by the sides 15*b* and 15*c*. As a result, it is possible to suppress wicking of the adhesive agent 12 along the valleys 26 connected to the corner portion 24 on the side surfaces 25 of the common flow paths 13*a* and 13*b*.

Second Embodiment

Figure 8A:
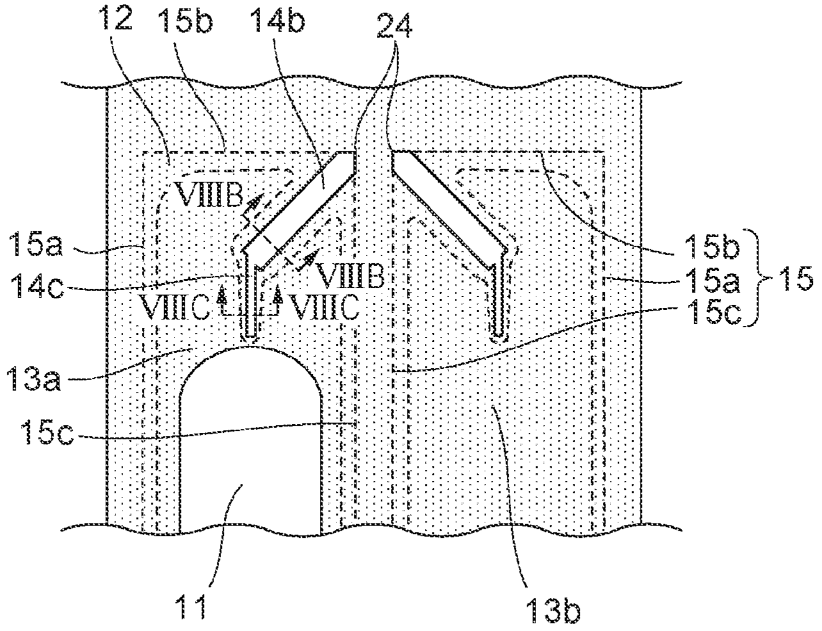
FIGS. 8A, 8B, and 8C are diagrams illustrating a print element substrate according to a second embodiment of the subject disclosure.
Figure 8B:
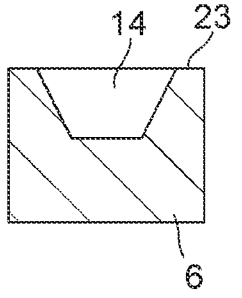
Figure 8C:
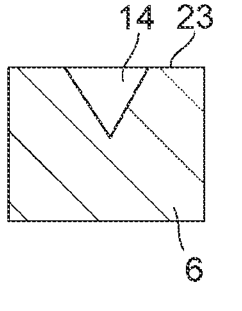

The groove-like recessed portion 14 formed in the surface 23 of the second flow path substrate 6 to store the protruding adhesive agent 12 may be divided into a plurality of sections in the longitudinal direction, and the divided sections may have different sectional shapes. The print element substrate 1 according to the second embodiment is used in the liquid ejection head illustrated in FIG. 1 as in the print element substrate 1 according to the first embodiment, but each of the groove-like recessed portions 14 formed in the second flow path substrate 6 is divided into two sections in the longitudinal direction. FIG. 8 illustrates the print element substrate 1 according to the second embodiment. FIG. 8A is a transparent top view of the second flow path substrate 6 as viewed from the first flow path substrate 5 with the ejection port forming member 2 removed, and FIGS. 8B and 8C are sectional views taken along lines VIIIB-VIIIB and VIIIC-VIIIC, respectively, in FIG. 8A. The print element substrate 1 according to the second embodiment differs from that according to the first embodiment illustrated in FIG. 1 only in the structure of the groove-like recessed portions 14 formed in the surface 23 of the second flow path substrate 6. Accordingly, for the print element substrate 1 according to the second embodiment, the sectional view corresponding to the sectional view taken along the line IIA-IIA in FIG. 1 is not illustrated.

As in the first embodiment, the groove-like recessed portions 14 extends from the positions exposed to the common flow paths 13*a* and 13*b* on the surface 23 of the second flow path substrate 6 to the corner portions 24 formed by sides 15*b* and 15*c*. In addition, each of the recessed portions 14 is divided into two sections in the longitudinal direction: a recessed portion 14*b*, which is a section close to the corner portion 24 (that is, one end side) and a recessed portion 14*c*, which is a section away from the corner portion 24 (that is, the other end side). FIG. 8B illustrates a cross section of the recessed portion 14*b*, and FIG. 8C illustrates a cross section of the recessed portion 14*c*. Since a large amount of the adhesive agent 12 flows into the recessed portion 14*b*, which is the section close to the corner portion 24, the width of the groove is large. On the other hand, since a strong capillary force is required to cause the adhesive agent 12 to flow into the recessed portion 14*c*, which is the section away from the corner portion 24, the width of the groove of the recessed portion 14*c* is smaller than that of the recessed portion 14*b*.

In the second embodiment, the number of sections of the groove-like recessed portion 14 divided in the longitudinal direction is not limited to two and may be three or more. In the second embodiment, in two adjacent sections of the recessed portion 14, the width of the recessed portion 14 in a section away from the corner portion 24 of the opening edge 15 need only be smaller than the width of the recessed portion 14 in a section close to the corner portion 24.

EXAMPLES

Next, the following describes, an example in which the print element substrate 1 described as the substrate joint body according to the present disclosure with reference to FIG. 2 was actually created, and the liquid ejection head was manufactured.

First, a silicon substrate having the first surface 21 on which the print element 9 including TaSiN, an electric circuit (not illustrated) for driving the print element 9, and the electrical signal input terminal 4 were formed was prepared, and the second surface 22 of this silicon substrate was thinned by a grinding apparatus such that the substrate thickness became 625 μm. Then, the common flow paths 13*a* and 13*b* and the liquid flow paths 10*a* and 10*b* were formed in the silicon substrate to obtain the first flow path substrate 5. In forming the common flow paths 13*a* and 13*b*, patterning was first performed using a photolithographic technique that uses a positive resist.

The common flow path 13*a* and the common flow path 13*b* were formed by using this positive resist subjected to pattering as a mask and etching the second surface 22 of the silicon substrate by applying a Bosch process. At this time, etching was performed for a predetermined time such that the depths of the common flow paths 13*a* and 13*b* became 450 μm. Subsequently, as in the formation of the common flow paths 13*a* and 13*b*, the first surface 21 of the silicon substrate was etched, and holes of 50 μm square were formed as the liquid flow paths 10*a* and 10*b* at positions communicating with the common flow paths 13*a* and 13*b*. As a result, the first flow path substrate 5 was completed.

A silicon substrate having a thickness of 725 μm was prepared as the second flow path substrate 6 separately from the first flow path substrate 5, and the through-flow path 11 having a depth of 350 μm and the groove-like recessed portions 14 having a depth of 150 μm were formed by the same procedure as the flow path formation in the first flow path substrate 5. At this point of time, the through-flow path 11 does not pass through the silicon substrate. In addition, each of the end portions of the recessed portions 14 was separated from the corner portion 24 formed by the sides 15*b* and 15*c* by 10 μm. After that, the surface of the silicon substrate facing away from the surface in which the recessed portions 14 were formed was thinned such that the through-flow path 11 passed through the silicon substrate, and the second flow path substrate 6 having a thickness of 300 μm was completed.

Next, a transfer base material that transfers the adhesive agent was prepared, and the transfer base material was spin-coated with a benzocyclobutene solution as the adhesive agent 12 so as to have a thickness of 3 μm. A PET (polyethylene terephthalate) film was used as the transfer base material. In addition, the transfer base material was subjected to baking treatment for 5 minutes at 100° C. to volatilize the solvent after the coating. After that, the adhesive agent 12 was transferred to the first flow path substrate 5 by bringing the adhesive agent 12 on the transfer base material into contact with the second surface 22 of the first flow path substrate 5 while applying heat.

Next, the first flow path substrate 5 and the second flow path substrate 6 were joined to each other by being heated at a temperature of 150° C. in a vacuum with a vacuum degree of 100 Pa or less while alignment was performed by a joint alignment apparatus. After these flow path substrates were completed and cooled, the first flow path substrate 5 and the second flow path substrate 6 joined to each other were taken from the apparatus, and heat treatment at 250° C. was performed for one hour in a nitrogen atmosphere in an oven to cure the adhesive agent 12. As a result, the substrate joint body including the first flow path substrate 5 and the second flow path substrate 6 joined to each other was completed. The adhesive agent 12 extruded from the joint portion flowed into the recessed portion 14 and was hardened in this state.

Next, a PET film was spin-coated with a solution obtained by dissolving a negative photosensitive resin at 100° C. in a propylene glycol 1-monoethyl ether 2-acetate (PGMEA) solvent and dried in the oven to form a dry film. Then, the dry film on the FET film was transferred to the surface 22 of the first flow path substrate 5 on which the print element 9 was formed, and the PET film was peeled off. After the dry film was transferred as described above, exposure and post-exposure bake treatment (PEB) were performed to form a latent image of the flow path forming region 8. Subsequently, dry films were laminated in the same manner, corresponding exposure and PEB were performed on the ejection port formation area 7, development was performed, and the pressure chamber 20 and the ejection ports 3 were collectively formed to complete the liquid ejection head. Blocking of the liquid flow paths 10*a* and 10*b* or the like was not observed in the obtained liquid ejection head.

According to the present disclosure, it is possible to obtain the substrate joint body that can be easily downsized and has high reliability, the method of manufacturing the substrate joint body, and the liquid ejection head that uses the substrate joint body.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-175333 filed Nov. 1, 2022, which is hereby incorporated by reference herein in its entirety.

What is claimed is:

1. A substrate joint body comprising:

a first substrate that has a first surface and a second surface facing away from the first surface, the first substrate having an opening formed in the second surface; and a second substrate joined to the second surface with an adhesive agent, the opening being covered with the second substrate, wherein a recessed portion extending from a position exposed to the opening toward a position facing an opening edge of the opening on the second surface is formed in a third surface of the second substrate such that an adhesive agent protruding from a joint portion between the first substrate and the second substrate reaches the recessed portion, the third surface facing the opening, and wherein the opening edge has a corner portion on the second surface, and the recessed portion extends from the position exposed to the opening toward a position facing the corner portion in the third surface.

2. The substrate joint body according to claim 1, wherein the recessed portion reaches the position facing the corner portion on the third surface.

3. The substrate joint body according to claim 1, wherein the recessed portion extends beyond the position facing the corner portion to a position at which the second surface and the third surface are joined to each other via the adhesive agent in the third surface.

4. A substrate joint body comprising:

a first substrate that has a first surface and a second surface facing away from the first surface, the first substrate having an opening formed in the second surface; and a second substrate joined to the second surface with an adhesive agent, the opening being covered with the second substrate, wherein a recessed portion extending from a position exposed to the opening toward a position facing an opening edge of the opening on the second surface is formed in a third surface of the second substrate such that an adhesive agent protruding from a joint portion between the first substrate and the second substrate reaches the recessed portion, the third surface facing the opening, and wherein the opening edge has a corner portion with an internal angle of less than 90° on the second surface, and two recessed portions that extend with respect to two sides of the opening edge that sandwich the corner portion with the internal angle of less than 90° are provided, the recessed portion being one of the two recessed portions.

5. The substrate joint body according to claim 4, wherein the two recessed portions have groove shapes and intersect each other in the third surface.

6. A substrate joint body comprising:

a first substrate that has a first surface and a second surface facing away from the first surface, the first substrate having an opening formed in the second surface; and a second substrate joined to the second surface with an adhesive agent, the opening being covered with the second substrate, wherein a recessed portion extending from a position exposed to the opening toward a position facing an opening edge of the opening on the second surface is formed in a third surface of the second substrate such that an adhesive agent protruding from a joint portion between the first substrate and the second substrate reaches the recessed portion, the third surface facing the opening, and wherein the opening edge on the second surface has a plurality of corner portions, and two or more recessed portions are provided to extend toward sides between two adjacent corner portions of the opening edge, the recessed portion being one of the two or more recessed portion.

7. The substrate joint body according to claim 1, wherein one end of the recessed portion has a groove shape extending toward the position facing the opening edge.

8. The substrate joint body according to claim 7, wherein a depth of the recessed portion is greater than a width of the recessed portion.

9. The substrate joint body according to claim 7, wherein the opening is an opening of an engraved portion formed in the first substrate, and a length of the recessed portion is greater than a depth of the engraved portion.

10. The substrate joint body according to claim 7, wherein an end portion of the adhesive agent protruding on the surface of the third surface is present between another end of the recessed portion and the opening edge.

11. The substrate joint body according to claim 10, wherein the recessed portion is divided into a plurality of sections in a longitudinal direction of the recessed portion, and a width of the recessed portion in one of the sections that is close to the other end is smaller than a width of the recessed portion in one of the sections that is close to the one end.

12. The substrate joint body according to The substrate joint body according to claim 2, wherein the opening is an opening of an engraved portion formed in the first substrate, and a through-hole leading to the first surface of the first substrate is formed in a bottom portion of the engraved portion.

13. A liquid ejection head comprising:

the substrate joint body according to claim 12;

a print element disposed on the first surface of the first substrate; and an ejection port, wherein a liquid supplied from the opening through the through-hole is ejected from the ejection port by driving the print element.

* * * * *